(12) United States Patent
Ryu (10) Patent No.: US 11,639,196 B2
(45) Date of Patent: May 2, 2023

(54) SUSPENSION STRUCTURE OF VEHICLE FOR SKATEBOARD PLATFORM

(71) Applicants: Hyundai Motor Company, Seoul (KR); Kia Corporation, Seoul (KR)

(72) Inventor: Sang Woock Ryu, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/592,153

(22) Filed: Feb. 3, 2022

(65) Prior Publication Data

US 2023/0085585 A1  Mar. 16, 2023

(30) Foreign Application Priority Data

Sep. 6, 2021 (KR) .......................... 10-2021-0118633

(51) Int. Cl.
*B62D 17/00* (2006.01)
*B60G 17/016* (2006.01)

(52) U.S. Cl.
CPC ......... *B62D 17/00* (2013.01); *B60G 17/0162* (2013.01); *B60G 2200/46* (2013.01); *B60G 2202/42* (2013.01); *B60G 2400/0513* (2013.01); *B60G 2400/05142* (2013.01); *B60G 2400/104* (2013.01); *B60G 2400/204* (2013.01)

(58) Field of Classification Search
CPC ........................... B62D 17/00; B60G 17/0162; B60G 2200/46; B60G 2202/42; B60G 2400/0513; B60G 2400/05142; B60G 2400/104; B60G 2400/204
See application file for complete search history.

(56) References Cited

U.S. PATENT DOCUMENTS

| | | | | |
|---|---|---|---|---|
| 2,076,852 A | * | 4/1937 | Leighton ................ | B62D 17/00 280/86.75 |
| 2,684,253 A | * | 7/1954 | Leighton ................ | B62D 17/00 280/86.751 |

(Continued)

FOREIGN PATENT DOCUMENTS

| KR | 100633945 B1 | * | 10/2006 |
|---|---|---|---|
| KR | 20100056699 A | * | 5/2010 |

(Continued)

OTHER PUBLICATIONS

Machine Translation of KR20120032340 (Year: 2012).*
Machine Translation of KR20120029919 (Year: 2012).*

*Primary Examiner* — Paul N Dickson
*Assistant Examiner* — Kurtis Nielson
(74) *Attorney, Agent, or Firm* — Slater Matsil, LLP (57) ABSTRACT

An embodiment suspension structure includes a rail housing configured to be installed in a vehicle body along a height direction of the vehicle body, a rail attached to the rail housing toward an outer side of the vehicle body, a plurality of variable position links configured to be moved in the height direction of the vehicle body by engaging with the rail, a link transfer screw threaded to the plurality of variable position links and disposed in parallel with the rail to allow the plurality of variable position links to move by rotation, and a screw motor fixed to an upper inner side of the rail housing and coupled to one end of the link transfer screw, the screw motor being configured to provide a driving force to rotate the link transfer screw.

20 Claims, 9 Drawing Sheets

(56) References Cited

U.S. PATENT DOCUMENTS

| | | | | |
|---|---|---|---|---|
| 3,273,910 A * | 9/1966 | Willingshofer | ........ | B62D 17/00 |
| | | | | 280/86.756 |
| 5,284,353 A * | 2/1994 | Shinji | .................... | B62D 17/00 |
| | | | | 280/124.141 |
| 6,688,616 B1 * | 2/2004 | Ziech | .................... | B62D 17/00 |
| | | | | 280/86.753 |
| 2019/0161122 A1 * | 5/2019 | Yamazaki | .............. | B62D 7/148 |
| 2019/0375455 A1 * | 12/2019 | No | ........................ | B60G 17/016 |
| 2021/0155290 A1 * | 5/2021 | Chen | ........................ | B62D 9/04 |

FOREIGN PATENT DOCUMENTS

| | | | | | |
|---|---|---|---|---|---|
| KR | 20120032340 A | * | 4/2012 | | |
| KR | 20200011210 A | * | 2/2020 | | |
| KR | 20120029919 A | * | 3/2021 | | |
| KR | 20210074660 A | * | 6/2021 | | |
| WO | WO-2009141535 A2 | * | 11/2009 | ............. | B60G 7/003 |

* cited by examiner

SUSPENSION STRUCTURE OF VEHICLE FOR SKATEBOARD PLATFORM

CROSS-REFERENCE TO RELATED APPLICATIONS

This application claims the benefit of Korean Patent Application No. 10-2021-0118633, filed on Sep. 6, 2021, which application is hereby incorporated herein by reference.

TECHNICAL FIELD

The present invention relates to a suspension structure of a vehicle for a skateboard platform.

BACKGROUND

An electric vehicle consists of a chassis system and a basic skeleton as a bottom plate, and a "skateboard platform" in which only passenger boarding and cargo loading spaces are variously configured depending on a purpose of vehicle use has been developed. In order to effectively utilize the skateboard platform, it is necessary to fabricate components more compactly, and since only an upper part of the vehicle is replaced according to various purposes, it is required that the skateboard platform itself of a lower part to be commonly used needs to satisfy the motion characteristics of various vehicles.

On the other hand, a suspension system of the vehicle is a device that connects a vehicle body and wheels using a plurality of links. Such a suspension system is designed to provide a comfortable ride to the occupant by effectively blocking pressure such as vibration or impact caused by irregular roads during traveling of the vehicle.

Further, the suspension system of the vehicle properly controls the shaking of the vehicle body caused by a driving operation of a driver and the flexure of the road to provide the driving convenience and maintains a vertical load on a tire ground plane at an appropriate level when driving on the irregular road to ensure the handling and stability when turning, braking, and driving the vehicle.

Since such a suspension system of the vehicle consists of sub-components having different dimensions depending on motion characteristics required in various vehicles, it is not easy to be commonly used. Further, since the suspension system is large, in the skateboard platform to maximally secure the degree of freedom of the vehicle body by minimizing the size of the chassis system, it is difficult to be compacted in a layout.

The above information disclosed in this Background section is only for enhancement of understanding of the background of the invention, and therefore it may contain information that does not form the prior art that is already known to a person of ordinary skill in the art.

SUMMARY

The present invention relates to a suspension structure of a vehicle for a skateboard platform. Particular embodiments relate to a suspension structure of a vehicle to which a skateboard platform is applied.

Embodiments of the present invention provide a suspension structure of a vehicle for a skateboard platform having advantages of optimizing respective different motion characteristics of various vehicle types in versatility and performance while being structurally compact according to a skateboard platform.

An exemplary embodiment of the present invention provides a suspension structure of a vehicle for a skateboard platform including a rail housing which is installed in the vehicle body along a height direction of the vehicle body and has a rail attached toward the outer side of the vehicle body, a plurality of variable position links which are provided to be moved in a height direction of the vehicle body by engaging with the rail, a link transfer screw which is threaded to the plurality of variable position links and disposed in parallel with the rail to allow the plurality of variable position links to move by rotation, and a screw motor which is fixed to the upper inner side of the rail housing and coupled to one end of the link transfer screw to provide a driving force so that the link transfer screw is rotated.

The suspension structure of the vehicle for the skateboard platform may further include a steering motor housing which is fixed with a steering motor disposed adjacent to a vehicle wheel to directly drive the vehicle wheel and is connected with the plurality of variable position links by a plurality of linkages.

The suspension structure of the vehicle for the skateboard platform may further include a shock absorber which has one end fixed to the upper inner side of the rail housing together with an elastic member and the other end movably connected to the steering motor housing to mitigate the vibration or shock of the vehicle body.

A rotation speed and the number of rotations of the screw motor may be adjusted by the controller (ECU) of the vehicle by using a steering angle, a vehicle speed, and a lateral acceleration signal inputted from the sensor when the vehicle is turning.

The plurality of variable position links may include a first variable position link and a second variable position link provided in parallel along the height direction of the vehicle body, and the first and second variable position links may be independently moved by rotation of the link transfer screw, so that the camber angle is adjusted.

The first and second variable position links may include rotation bushes which are screwed with the link transfer screw to move along the link transfer screw by the rotation of the link transfer screw, bush disks formed integrally with the rotation bushes and extending in a radial direction of the rotation bushes at one side of the rotation bush, and link stoppers disposed between the rotation bushes and the rail and provided to be in contact with or spaced apart from the rail.

The link stopper may be disposed inside a rotation bush housing provided to cover the outside of the rotation bush.

The link stopper may have threads formed on the outer surface thereof so as to engage with the rail in contact with the rail so that the variable position link is fixed.

Electromagnets attached to each other according to a current application may be provided on the opposed inner surfaces of the link stopper and the rotation bush housing, respectively.

Reaction springs providing a reaction for pushing the link stoppers toward the rail side so as to engage with the rail may be provided on the opposed inner surfaces of the link stopper and the rotation bush housing.

A caliper may be provided in the rotation bush housing to grip and fix the bush disk.

When the caliper grips and fixes the bush disk, the electromagnets may be attached to each other by applying the current, so that the link stopper and the rail are spaced apart from each other, and when the caliper releases the bush disk, the electromagnets may be spaced apart from each other by releasing the current and the link stopper engages with the rail in contact with the rail by the reaction of the reaction spring.

According to an exemplary embodiment of the present invention, it is possible to satisfy a compact size and optimal performance for a skateboard platform of a vehicle.

Further, even if an upper structure of the skateboard platform is dualized depending on the use purpose of the vehicle, a motion characteristic optimized for the vehicle may be implemented using a virtual suspension structure, so that it is possible to be commonly used.

Further, a camber angle is changed using a variable position link while continuously monitoring a steering angle, a vehicle speed, and a lateral acceleration of the vehicle, thereby implementing suspension performance according to optimal motion characteristics.

Further, the height of the linkage connected to the variable position link is adjusted according to a garage to be applicable without a change in hardware, thereby maximizing the versatility of the skateboard platform and reducing costs by mass production through common use.

The following elements may be used in connection with the drawings to describe embodiments of the present disclosure.

| | |
|---|---|
| 1000: Steering system | 10: Rail housing |
| 12: Rail | 20: First variable position link |
| 22, 32: Rotation bush | 24, 34: Bush disk |
| 25, 35: Caliper | 26, 36: Link stopper |
| 27, 37: Electromagnet | 28, 38: Rotation bush housing |
| 29, 39: Reaction spring | 30: Second variable position link |
| 40: Link transfer screw | 50: Screw motor |
| 60: Steering motor housing | 62, 64: Linkage |
| 70: Shock absorber | 72: Elastic member |
| 200: Steering motor | 300: Controller (ECU) |
| 400: Sensor | W: Wheel |

DETAILED DESCRIPTION OF ILLUSTRATIVE EMBODIMENTS

Hereinafter, exemplary embodiments of the present invention will be described in detail with reference to the accompanying drawings so as to easily implement those with ordinary skill in the art to which the present invention pertains. The present invention may be implemented in various different forms and is not limited to embodiments described herein.

In various exemplary embodiments, components having the same configuration are described using the same reference numerals only in a representative exemplary embodiment, and in other exemplary embodiments, only configurations different from the representative exemplary embodiment will be described.

It is noted that the drawings are schematic and not illustrated according to a scale. The relative dimensions and ratios of parts in the drawings are exaggerated or reduced in their sizes for clarity and convenience in the drawings, and any dimension is just illustrative, and is not limited. In addition, in the same structures, elements, or components shown in two or more drawings, the same reference numerals are used to represent similar features. When it is mentioned that any part is disposed "above" or "on" the other part, the part may be disposed directly on the other part or another part may be included therebetween.

Exemplary embodiments of the present invention will be described in detail. As a result, various modifications of the drawings will be expected. Therefore, the exemplary embodiments are not limited to a specific form of the illustrated region, and for example, include modifications in the form by manufacturing.

Hereinafter, a suspension structure of a vehicle for a skateboard platform according to an exemplary embodiment of the present invention and a steering system applying the same will be described with reference to FIGS. 1 and 2.

Figure 1:
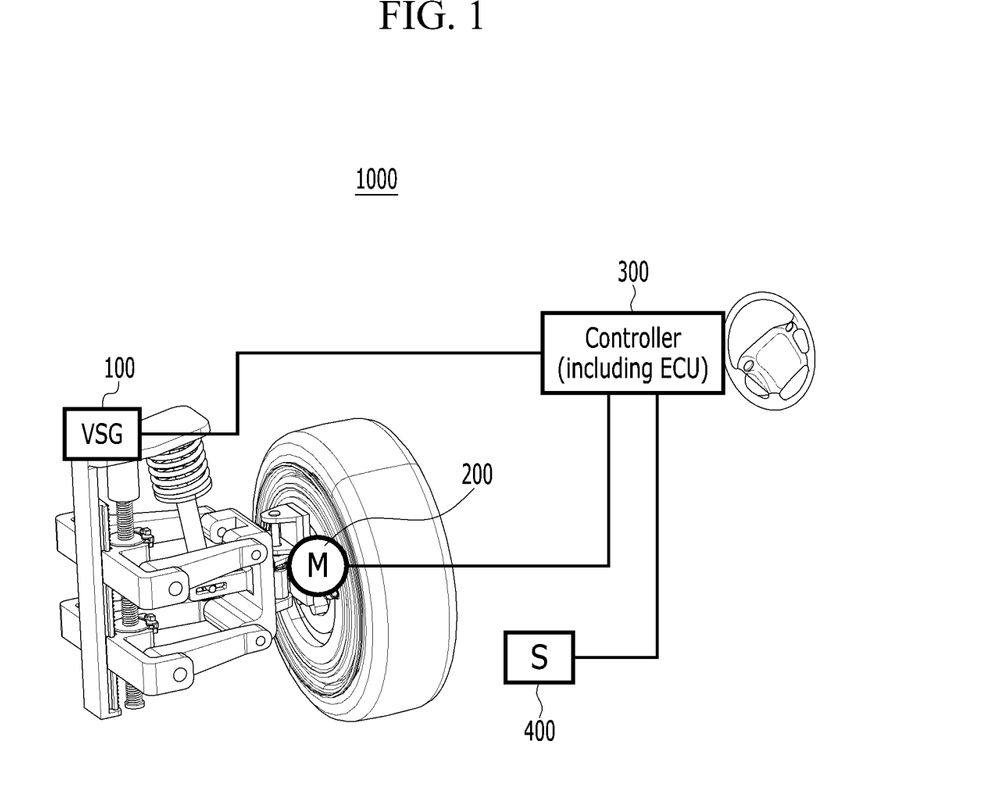
FIG. 1 is a diagram illustrating a steering system to which a suspension structure of a vehicle for a skateboard platform according to an exemplary embodiment of the present invention is applied.
Figure 2:
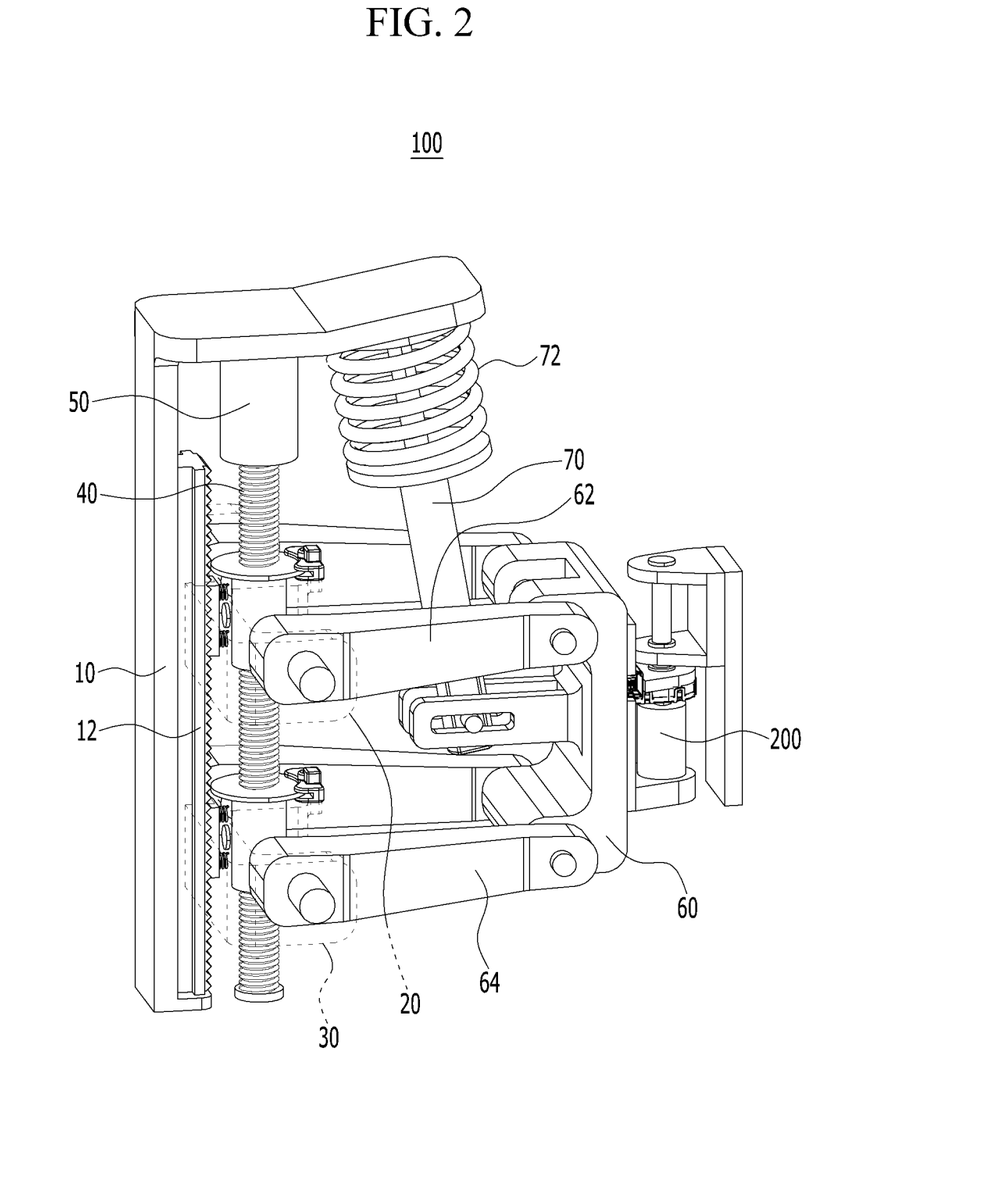
FIG. 2 is a diagram illustrating a suspension structure of a vehicle for a skateboard platform according to an exemplary embodiment of the present invention.

FIG. 1 is a diagram illustrating a steering system to which a suspension structure of a vehicle for a skateboard platform according to an exemplary embodiment of the present invention is applied, and FIG. 2 is a diagram illustrating a suspension structure of a vehicle for a skateboard platform according to an exemplary embodiment of the present invention.

First, referring to FIG. 1, a steering system 1000 includes a suspension structure of a vehicle for a skateboard platform 100 (virtual suspension geometry (VSG)) according to an exemplary embodiment of the present invention, and when a driver turns a steering wheel, an appropriate rotational angle is calculated by a controller (ECU) 300 and a steering motor 200 mounted on a steering shaft turns a wheel W according to the rotational angle calculated by the controller 300. At this time, the controller 300 allows the VSG 100 to adjust a camber angle of the wheel W by using a steering angle, a vehicle speed, and a lateral acceleration signal input to the controller 300 from a sensor 400.

Referring to FIG. 2, the suspension structure of the vehicle for the skateboard platform according to an exemplary embodiment of the present invention includes a rail housing 10, a plurality of variable position links 20 and 30, a link transfer screw 40, and a screw motor 50 so as to adjust the camber angle of the wheel W.

The rail housing 10 is installed in the vehicle body along a height direction of the vehicle body, and has a rail 12 attached toward the outer side of the vehicle body. Further, the upper side of the rail housing 10 may be formed in a shape that is bent at a predetermined angle toward the outer side of the vehicle body in a horizontal direction of the vehicle body.

The plurality of variable position links 20 and 30 may be provided in two in parallel along the height direction of the vehicle body, and may be configured by a first variable position link 20 located on the upper side and a second variable position link 30 located on the lower side. The first and second variable position links 20 and 30 may be installed to be movable while engaging with the rails 12 provided in the rail housing 10. The first and second variable position links 20 and 30 may be independently moved by rotation of the link transfer screw 40, so that the camber angle of the wheel W may be adjusted.

The link transfer screw 40 may be threaded to the variable position links 20 and 30 and disposed in a parallel direction with the rail 12 to allow the variable position links 20 and 30 to move by rotation.

The screw motor 50 is fixed to the upper inner side of the rail housing 10 and coupled to one end of the link transfer screw 40 to provide a driving force so that the link transfer screw 40 is rotated.

Meanwhile, the suspension structure 100 of the vehicle for the skateboard platform according to an exemplary embodiment of the present invention may further include a steering motor housing 60 on which the steering motor 200 is mounted and fixed. The steering motor housing 60 is connected to the variable position links 20 and 30 by a plurality of linkages 62 and 64. The angles of the linkages 62 and 64 are changed according to a change in camber angle depending on the relative movement of the two variable position links 20 and 30, so that the steering motor housing 60 forms a camber angle thereto.

Further, the suspension structure 100 of the vehicle for the skateboard platform according to an exemplary embodiment of the present invention may further include a shock absorber 70 disposed over the upper inner side of the rail housing 10 and the steering motor housing 60. The shock absorber 70 has one end fixed to the upper inner side of the rail housing 10 together with an elastic member 72 and the other end movably connected to the steering motor housing 60 to mitigate the vibration or shock of the vehicle body. The other end of the shock absorber 70 may be provided to be connected to the steering motor housing 60 on the opposite side of the steering motor 200.

An opening is formed on the portion of the steering motor housing 60 to which the other end of the shock absorber 70 is connected to be inserted with a protrusion formed at the other end of the shock absorber 70, so that the shock absorber 70 may be slightly moved in a horizontal direction of the vehicle according to the change in camber angle of the steering motor housing 60.

Figure 3:
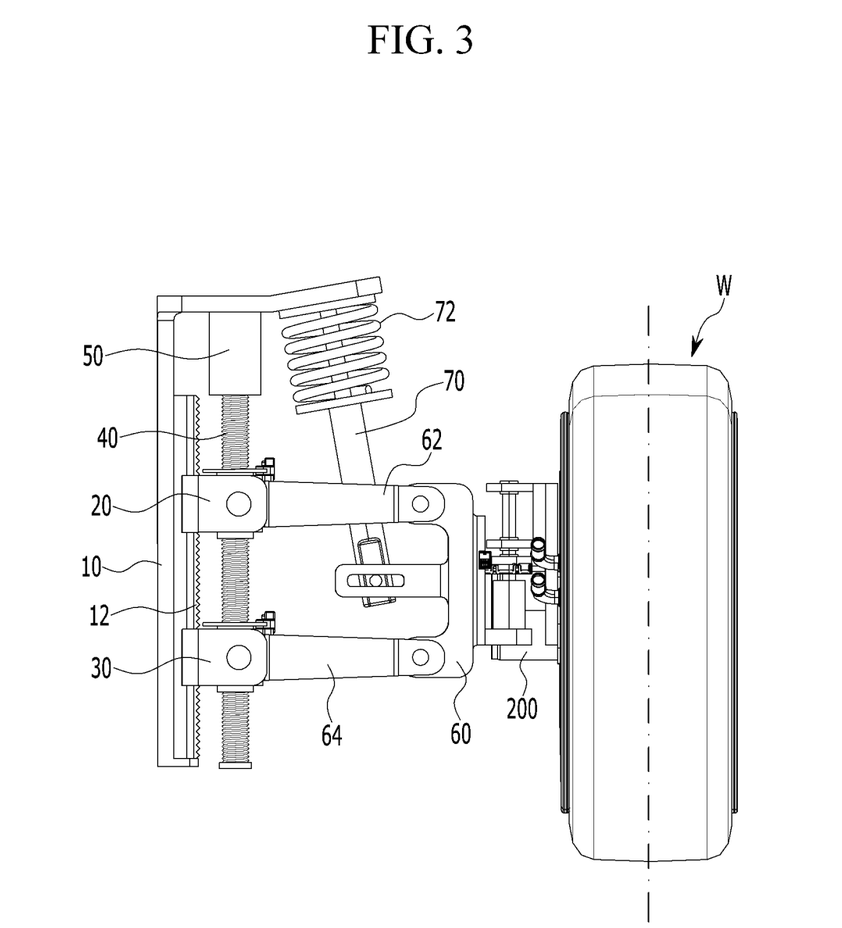
FIG. 3 is a diagram illustrating a neutral state of the suspension structure of the vehicle for the skateboard platform according to an exemplary embodiment of the present invention.
Figure 4:
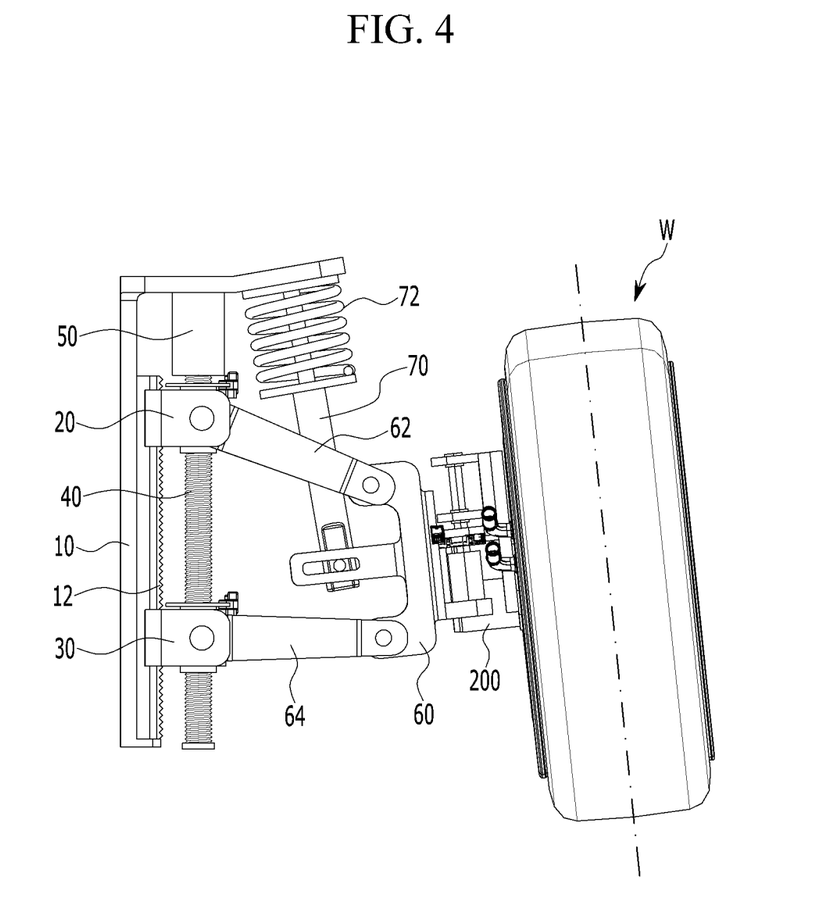
FIG. 4 is a diagram illustrating a (+) camber angle of the suspension structure of the vehicle for the skateboard platform according to an exemplary embodiment of the present invention.

FIG. 3 is a diagram illustrating a neutral state of the suspension structure of the vehicle for the skateboard platform according to an exemplary embodiment of the present invention, and FIG. 4 is a diagram illustrating a (+) camber angle of the suspension structure of the vehicle for the skateboard platform according to an exemplary embodiment of the present invention.

Referring to FIGS. 3 and 4, in a typical straight driving state of the vehicle, the variable position links 20 and 30 are fixed in a neutral position optimized for straightness and are in a neutral state in which the camber angle of the wheel W is 0°. When the vehicle is turning, the VSG 100 adjusts the camber angle of the wheel W by using the steering angle, the vehicle speed, and the lateral acceleration signal inputted from the sensor 400. The neutral position is applicable by adjusting the height of the linkages 62 and 64 connected with the variable position links 20 and 30 according to a garage.

Meanwhile, in this specification, in the camber angle of the wheel W, a state where the upper side of the wheel W is inclined toward the vehicle body based on the neutral state of FIG. 4 is defined as a (+) camber angle state and a state in which the upper side of the wheel W is inclined toward an opposite direction of the vehicle body is defined as a (−) camber angle state.

As illustrated in FIG. 4, in the case of the (+) camber angle state, while the screw motor 50 is driven to rotate the link transfer screw 40, the upper first variable position link 20 moves upward and the lower second variable position link 30 is fixed. In this case, while the linkage 62 connected to the first variable position link 20 is pulled and inclined toward the inside of the vehicle body according to the movement of the first variable position link 20, the upper portion of the steering motor housing 60 is also pulled toward the inside of the vehicle body. Accordingly, the upper side of the wheel W is inclined toward the vehicle body to form the (+) camber angle state.

Figure 5:
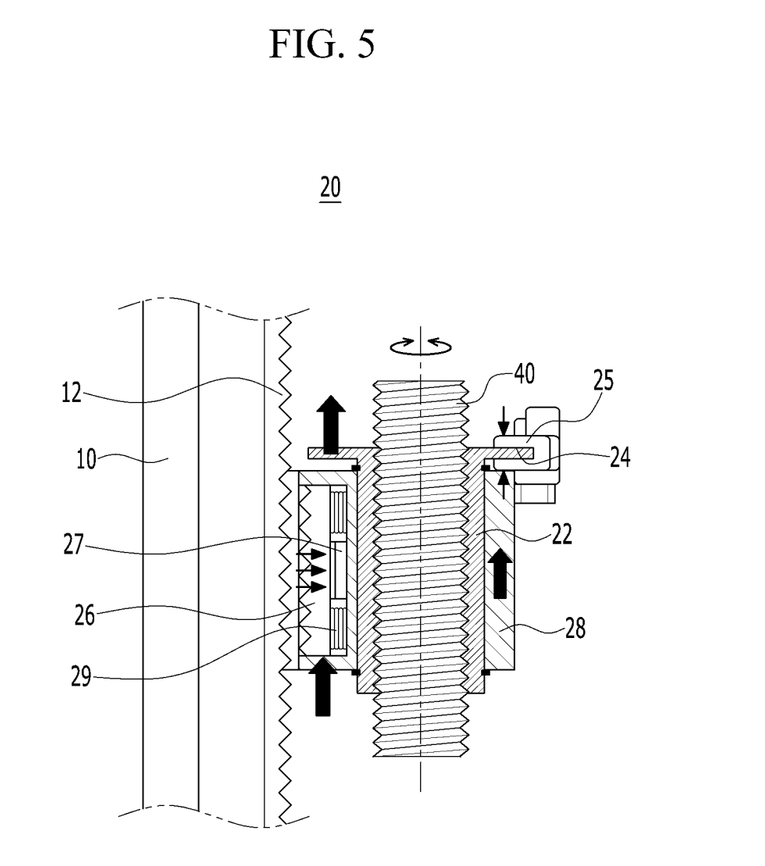
FIG. 5 is a diagram illustrating an operation state of a first variable position link located at an upper part in the (+) camber angle state of the suspension structure of the vehicle for the skateboard platform according to an exemplary embodiment of the present invention.
Figure 6:
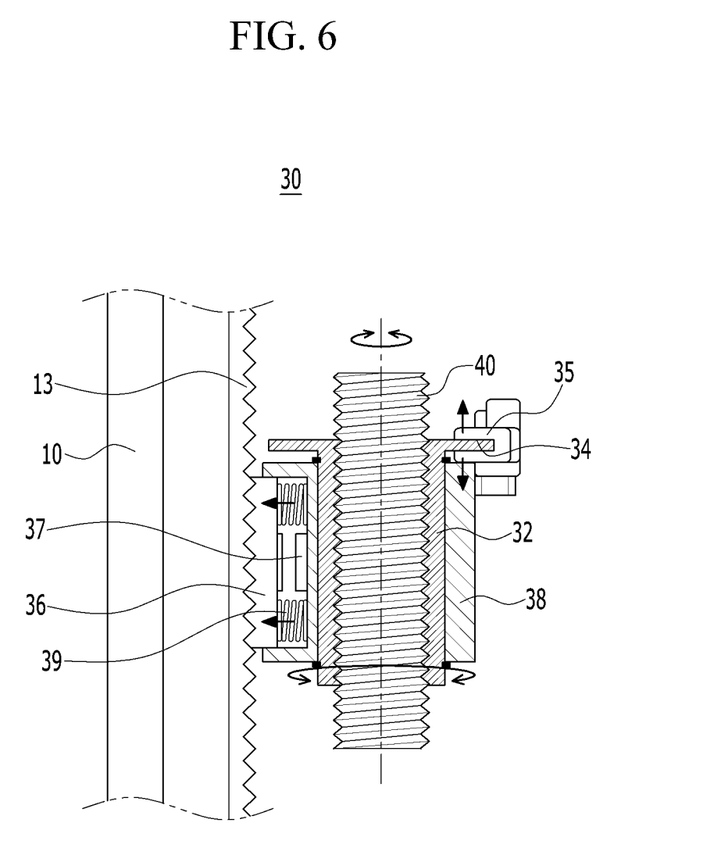
FIG. 6 is a diagram illustrating an operation state of a second variable position link located at a lower part in the (+) camber angle state of the suspension structure of the vehicle for the skateboard platform according to an exemplary embodiment of the present invention.

FIG. 5 is a diagram illustrating an operation state of a first variable position link located at an upper part in the (+) camber angle state of the suspension structure of the vehicle for the skateboard platform according to an exemplary embodiment of the present invention, and FIG. 6 is a diagram illustrating an operation state of a second variable position link located at a lower part in the (+) camber angle state of the suspension structure of the vehicle for the skateboard platform according to an exemplary embodiment of the present invention.

Referring to FIGS. 5 and 6, the variable position links 20 and 30 include hollow rotation bushes 22 and 32 into which the link transfer screw 40 is inserted, bush disks 24 and 34 which are formed integrally with the rotation bushes 22 and 32 and extend in radial directions of the rotation bushes 22 and 32 at one side of the rotation bushes 22 and 32, and link stoppers 26 and 36 disposed between the rotation bushes 22 and 32 and the rail 12.

Threads are formed inside the rotation bushes 22 and 32 to be coupled with threads formed on the outer surface of the link transfer screw 40. Accordingly, the rotation bushes 22 and 32 may be moved in a vertical direction of the vehicle body along the link transfer screw 40 by the rotation of the link transfer screw 40.

Meanwhile, the link stoppers 26 and 36 may be provided to be in contact with or spaced apart from the rail 12 and may be disposed inside rotation bush housings 28 and 38 provided to cover the outsides of the rotation bushes 22 and 32. Threads may be formed on the outer surfaces of the link stoppers 26 and 36 and engage with the rail 12 in contact with the rail 12, so that the variable position links 20 and 30 may be fixed without moving in the vertical direction of the vehicle body.

Meanwhile, electromagnets 27 and 37 attached to each other depending on the current application may be provided on the opposed inner surfaces of the link stoppers 26 and 36 and the rotation bush housings 28 and 38, respectively. In addition, reaction springs 29 and 39 providing a reaction for pushing the link stoppers 26 and 36 toward the rail 12 side so as to engage with the rail 12 may be provided on the opposed inner surfaces of the link stoppers 26 and 36 and the rotation bush housings 28 and 38.

Calipers 25 and 35 may be provided in the rotation bush housing 28 and 38 to grip and fix the bush disks 24 and 34 up and down in the vertical direction of the vehicle body.

As illustrated in FIG. 5, in the (+) camber angle state, the first variable position link 20 needs to move toward the upper portion in the vertical direction of the vehicle body. To this end, the caliper 25 grips the bush disk 24 so that the rotation bush housing 28 and the rotation bush 22 are fixed, and the current is applied to the electromagnets 27 so that the electromagnets 27 are attached to each other, and the link stopper 26 is moved toward the rotation bush 22 inside the rotation bush housing 28. As a result, the link stopper 26 is spaced apart from the rail 12. The integrated rotation bush 22 and rotation bush housing 28 moves toward the upper portion in the vertical direction of the vehicle body by rotation of the link transfer screw 40.

Meanwhile, as illustrated in FIG. 6, in the (+) camber angle state, the second variable position link 30 is fixed without moving in the vertical direction of the vehicle body. To this end, the caliper 35 releases the bush disk 34. While the rotation bush housing 38 and the rotation bush 32 are not fixed, the current application is released from the electromagnets 37 so that the electromagnets 37 are spaced apart from each other, and the link stopper 36 is fixed by engaging with the rail 12 by the reaction spring 39 provided on the opposed inner surfaces of the link stopper 36 and the rotation bush housing 38. The rotation bush housing 38 is fixed by the link stopper 36 and the rotation bush 32 is not integrated with the rotation bush housing 38 and may be freely rotated in place without moving up and down in the vertical direction of the vehicle body inside the rotation bush housing 38 even if the link transfer screw 40 rotates. Accordingly, the second variable position link 30 may be fixed without moving up and down in the vertical direction of the vehicle body.

Figure 7:
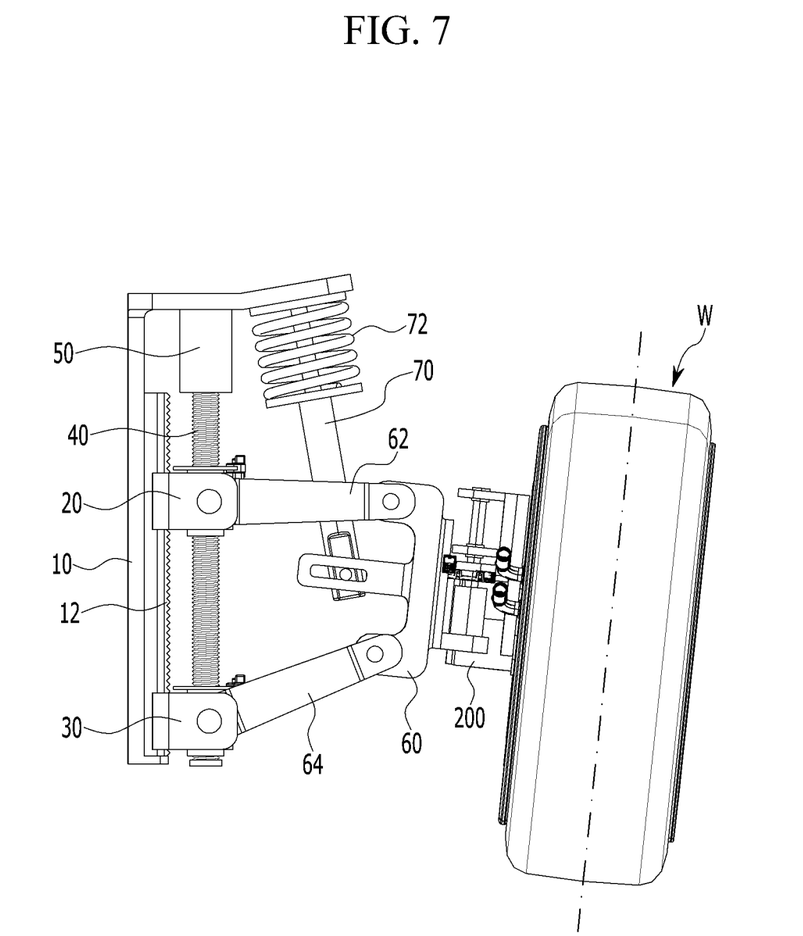
FIG. 7 is a diagram illustrating a (−) camber angle state of the suspension structure of the vehicle for the skateboard platform according to an exemplary embodiment of the present invention.
Figure 8:
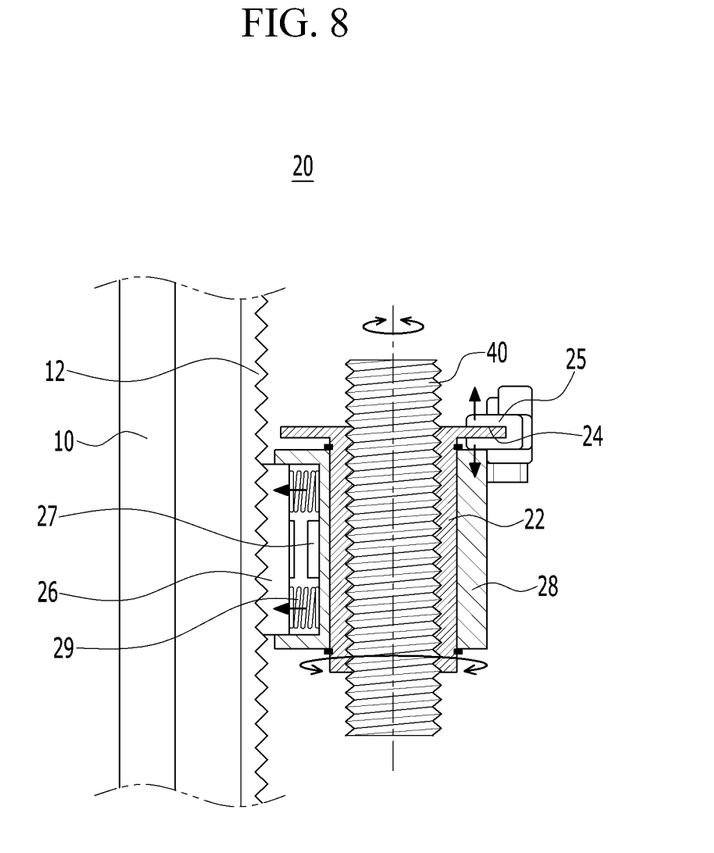
FIG. 8 is a diagram illustrating an operation state of a first variable position link located at an upper part in the (−) camber angle state of the suspension structure of the vehicle for the skateboard platform according to an exemplary embodiment of the present invention.
Figure 9:
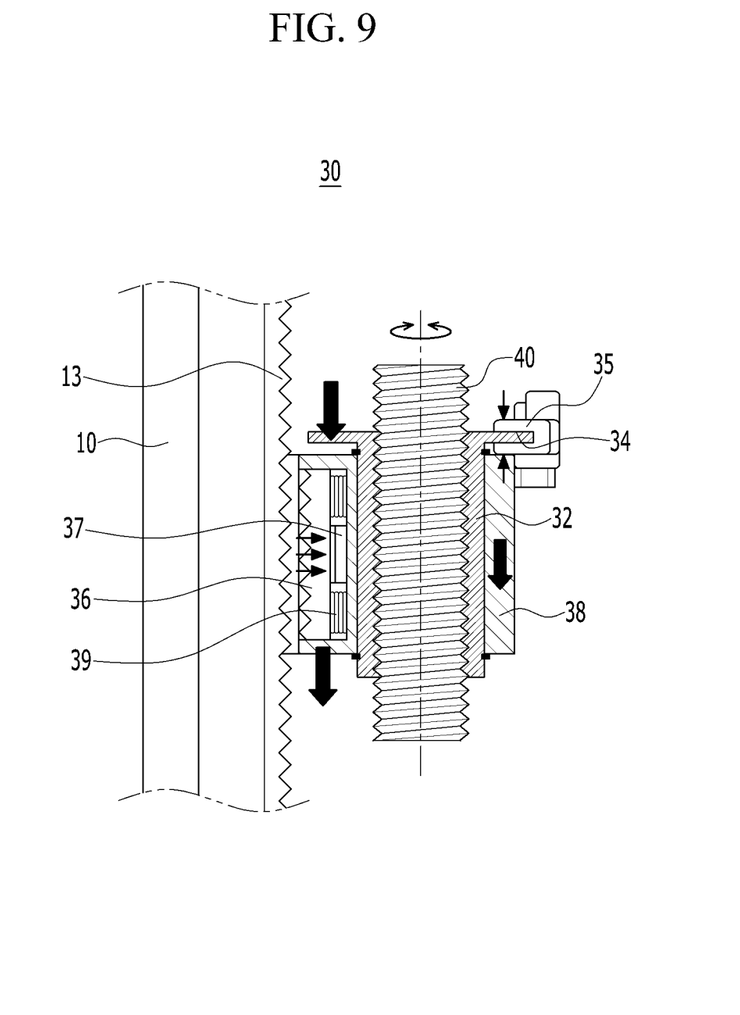
FIG. 9 is a diagram illustrating an operation state of a second variable position link located at a lower part in the (−) camber angle state of the suspension structure of the vehicle for the skateboard platform according to an exemplary embodiment of the present invention.

FIG. 7 is a diagram illustrating a (−) camber angle state of the suspension structure of the vehicle for the skateboard platform according to an exemplary embodiment of the present invention, FIG. 8 is a diagram illustrating an operation state of a first variable position link located at an upper part in the (−) camber angle state of the suspension structure of the vehicle for the skateboard platform according to an exemplary embodiment of the present invention, and FIG. 9 is a diagram illustrating an operation state of a second variable position link located at a lower part in the (−) camber angle state of the suspension structure of the vehicle for the skateboard platform according to an exemplary embodiment of the present invention.

As illustrated in FIG. 7, in the case of the (−) camber angle state, while the screw motor 50 is driven to rotate the link transfer screw 40, the lower second variable position link 30 moves downward and the upper first variable position link 20 is fixed. In this case, while the linkage 64 connected to the second variable position link 30 is pulled and inclined toward the inside of the vehicle body according to the movement of the second variable position link 30, the lower portion of the steering motor housing 60 is also pulled toward the inside of the vehicle body. Accordingly, the lower side of the wheel W is inclined toward the vehicle body to form the (−) camber angle state.

As illustrated in FIG. 8, in the (−) camber angle state, the first variable position link 20 is fixed without moving in the vertical direction of the vehicle body. To this end, the caliper 25 releases the bush disk 24. While the rotation bush housing 28 and the rotation bush 22 are not fixed, the current application is released from the electromagnets 27 so that the electromagnets 27 are spaced apart from each other, and the link stopper 26 is fixed by engaging with the rail 12 by the reaction spring 29 provided on the opposed inner surfaces of the link stopper 26 and the rotation bush housing 28. The rotation bush housing 28 is fixed by the link stopper 26 and the rotation bush 22 is not integrated with the rotation bush housing 28 and may be freely rotated in place without moving up and down in the vertical direction of the vehicle body inside the rotation bush housing 28 even if the link transfer screw 40 rotates. Accordingly, the first variable position link 20 may be fixed without moving up and down in the vertical direction of the vehicle body.

As illustrated in FIG. 9, in the (−) camber angle state, the second variable position link 30 needs to move toward the lower portion in the vertical direction of the vehicle body. To this end, the caliper 35 grips the bush disk 34 so that the rotation bush housing 38 and the rotation bush 32 are fixed, and the current is applied to the electromagnets 37 so that the electromagnets 37 are attached to each other, and the link stopper 36 is moved toward the rotation bush 32 inside the rotation bush housing 38. As a result, the link stopper 36 is spaced apart from the rail 12. The integrated rotation bush 32 and rotation bush housing 38 moves toward the lower portion in the vertical direction of the vehicle body by the rotation of the link transfer screw 40.

As illustrated in FIGS. 4 to 9, in the (+) camber angle state, the first variable position link 20 is moved toward the upper portion in the vertical direction of the vehicle body and the second variable position link 30 is fixed, and in the (−) camber angle state, the first variable position link 20 is fixed and the second variable position link 30 is moved toward the lower portion in the vertical direction of the vehicle body. Accordingly, in the (+) camber angle state and the (−) camber angle state, the rotating direction of the link transfer screw 40 is opposite to each other.

As such, according to embodiments of the present invention, it is possible to satisfy a compact size and optimal performance for a skateboard platform of a vehicle.

Further, even if an upper structure of the skateboard platform is dualized depending on the use purpose of the vehicle, a motion characteristic optimized for the vehicle may be implemented using a virtual suspension structure, so that it is possible to be commonly used.

Further, a camber angle is changed using a variable position link while continuously monitoring a steering angle, a vehicle speed, and a lateral acceleration of the vehicle, thereby implementing suspension performance according to optimal motion characteristics.

Further, the height of the linkage connected to the variable position link is adjusted according to a garage to be applicable without a change in hardware, thereby maximizing the versatility of the skateboard platform and reducing costs by mass production through common use.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A suspension structure comprising:
a rail housing configured to be installed in a vehicle body along a height direction of the vehicle body;
a rail attached to the rail housing toward an outer side of the vehicle body;
a plurality of variable position links configured to be moved in the height direction of the vehicle body along the rail;
a link transfer screw threaded to the plurality of variable position links and disposed in parallel with the rail to allow the plurality of variable position links to move by rotation; and
a screw motor fixed to an upper inner side of the rail housing and coupled to one end of the link transfer screw, the screw motor being configured to provide a driving force to rotate the link transfer screw; and
a steering motor fixed in a steering motor housing adjacent to a vehicle wheel, wherein the steering motor is configured to directly drive the vehicle wheel and is connected with the plurality of variable position links by a plurality of linkages.

2. The suspension structure of claim 1, further comprising a shock absorber having a first end fixed to the upper inner side of the rail housing together with an elastic member and a second end movably connected to the steering motor housing, wherein the shock absorber is configured to mitigate a vibration or a shock of the vehicle body.

3. The suspension structure of claim 1, wherein the screw motor is configured to be adjusted by a controller of a vehicle to adjust a rotation speed and a number of rotations of the screw motor by using a steering angle, a vehicle speed, and a lateral acceleration signal inputted from a sensor during turning of the vehicle.

4. A suspension structure comprising:
a rail housing configured to be installed in a vehicle body along a height direction of the vehicle body;
a rail attached to the rail housing toward an outer side of the vehicle body;
a first variable position link and a second variable position link provided in parallel along the height direction of the vehicle body and configured to be moved in the height direction of the vehicle body along the rail;
a link transfer screw threaded to the first and second variable position links and disposed in parallel with the rail to allow the first and second variable position links to move by rotation, wherein the first and second variable position links are configured to be independently moved by a rotation of the link transfer screw to adjust a camber angle; and
a screw motor fixed to an upper inner side of the rail housing and coupled to one end of the link transfer screw, the screw motor being configured to provide a driving force to rotate the link transfer screw.

5. The suspension structure of claim 4, wherein the first and second variable position links comprise:
rotation bushes configured to be rotated with the link transfer screw to move along the link transfer screw by the rotation of the link transfer screw;
bush disks formed integrally with the rotation bushes and extending in a radial direction of the rotation bushes at one side of the rotation bushes; and
link stoppers disposed between the rotation bushes and the rail and provided to be in contact with or spaced apart from the rail.

6. The suspension structure of claim 5, wherein the link stoppers are disposed inside rotation bush housings provided to cover outsides of the rotation bushes.

7. The suspension structure of claim 6, further comprising electromagnets provided on opposed inner surfaces of the link stoppers and the rotation bush housings, respectively, wherein the electromagnets are configured to be attached to or released from each other.

8. The suspension structure of claim 6, further comprising reaction springs provided on opposed inner surfaces of the link stoppers and the rotation bush housings, wherein the reaction springs are configured to provide a reaction for pushing the link stoppers toward the rail so as to engage with the rail.

9. The suspension structure of claim 6, further comprising calipers in the rotation bush housings, wherein the calipers are configured to grip and fix the bush disks.

10. The suspension structure of claim 6, further comprising:
electromagnets provided on opposed inner surfaces of the link stoppers and the rotation bush housings, respectively, wherein the electromagnets are configured to be attached to or released from each other;
reaction springs provided on opposed inner surfaces of the link stoppers and the rotation bush housings, wherein the reaction springs are configured to provide a reaction for pushing the link stoppers toward the rail side so as to engage with the rail; and
calipers in the rotation bush housings, wherein the calipers are configured to grip and fix the bush disks;
wherein when the calipers grip and fix the bush disks, the electromagnets are attached to each other by applying a current, so that the link stoppers and the rail are spaced apart from each other; and
wherein when the calipers release the bush disks, the electromagnets are spaced apart from each other by releasing the current, and the link stoppers engage with the rail in contact with the rail by the reaction of the reaction spring.

11. The suspension structure of claim 5, wherein the link stoppers have threads formed on outer surfaces thereof so as to engage with the rail in contact with the rail so that the first and second variable position links are fixed.

12. The suspension structure of claim 4, further comprising a steering motor fixed in a steering motor housing adjacent to a vehicle wheel, wherein the steering motor is configured to directly drive the vehicle wheel and is connected with the plurality of variable position links by a plurality of linkages.

13. The suspension structure of claim 12, further comprising a shock absorber having a first end fixed to the upper inner side of the rail housing together with an elastic member and a second end movably connected to the steering motor housing, wherein the shock absorber is configured to mitigate a vibration or a shock of the vehicle body.

14. A vehicle having a skateboard platform, the vehicle comprising:
a vehicle body;
a vehicle wheel coupled to the vehicle body;

a suspension structure coupled to the vehicle body and the vehicle wheel, wherein the suspension structure comprises:
- a rail housing installed in the vehicle body along a height direction of the vehicle body;
- a rail attached to the rail housing toward an outer side of the vehicle body;
- a plurality of variable position links configured to be moved in the height direction of the vehicle body along the rail;
- a link transfer screw threaded to the plurality of variable position links and disposed in parallel with the rail to allow the plurality of variable position links to move by rotation; and
- a screw motor fixed to an upper inner side of the rail housing and coupled to one end of the link transfer screw, the screw motor being configured to provide a driving force to rotate the link transfer screw; and
- a steering motor fixed in a steering motor housing adjacent to the vehicle wheel, wherein the steering motor is connected with the plurality of variable position links by a plurality of linkages.

15. The vehicle of claim 14, further comprising a shock absorber having a first end fixed to the upper inner side of the rail housing together with an elastic member and a second end movably connected to the steering motor housing.

16. The vehicle of claim 14, further comprising:
- a sensor configured to output a steering angle, a vehicle speed, and a lateral acceleration signal; and
- a controller configured to adjust a rotation speed and a number of rotations of the screw motor by using the steering angle, the vehicle speed, and the lateral acceleration signal from the sensor during turning of the vehicle.

17. The vehicle of claim 14, wherein the plurality of variable position links comprise a first variable position link and a second variable position link provided in parallel along the height direction of the vehicle body and configured to be moved in the height direction of the vehicle body along the rail.

18. The vehicle of claim 17, wherein the first and second variable position links are configured to be independently moved by a rotation of the link transfer screw to adjust a camber angle.

19. The vehicle of claim 18, wherein the first and second variable position links comprise:
- rotation bushes configured to be rotated with the link transfer screw to move along the link transfer screw by the rotation of the link transfer screw;
- bush disks formed integrally with the rotation bushes and extending in a radial direction of the rotation bushes at one side of the rotation bushes; and
- link stoppers disposed between the rotation bushes and the rail and provided to be in contact with or spaced apart from the rail.

20. The vehicle of claim 19, wherein the link stoppers have threads formed on outer surfaces thereof so as to engage with the rail in contact with the rail so that the first and second variable position links are fixed.

\* \* \* \* \*